United States Patent
Kobayashi

(10) Patent No.: US 7,511,746 B2
(45) Date of Patent: Mar. 31, 2009

(54) DIGITAL CAMERA AND SOLID STATE IMAGING DEVICE

(75) Inventor: Hirokazu Kobayashi, Saiatama (JP)

(73) Assignee: FUJIFILM CORPORATION, Tokyo (JP)

( * ) Notice: Subject to any disclaimer, the term of this patent is extended or adjusted under 35 U.S.C. 154(b) by 972 days.

(21) Appl. No.: 10/986,670

(22) Filed: Nov. 12, 2004

(65) Prior Publication Data

US 2005/0111061 A1 May 26, 2005

(30) Foreign Application Priority Data

Nov. 14, 2003 (JP) ............... P.2003-384645

(51) Int. Cl.
*H04N 9/64* (2006.01)
*H04N 5/228* (2006.01)
(52) U.S. Cl. .................... 348/243; 348/222.1
(58) Field of Classification Search ............. 348/241, 348/243, 222.1; 358/513
See application file for complete search history.

(56) References Cited

U.S. PATENT DOCUMENTS

| | | | |
|---|---|---|---|
| 6,791,615 B1 * | 9/2004 | Shiomi et al. | 348/323 |
| 7,304,673 B2 * | 12/2007 | Erhardt et al. | 348/275 |
| 7,386,185 B2 * | 6/2008 | Watanabe et al. | 382/274 |
| 2001/0002154 A1 * | 5/2001 | Ohuchi et al. | 359/621 |
| 2002/0118407 A1 | 8/2002 | Komobuchi et al. | |

FOREIGN PATENT DOCUMENTS

JP 2002-330356 11/2002

* cited by examiner

*Primary Examiner*—Lin Ye
*Assistant Examiner*—Leslie Virany
(74) *Attorney, Agent, or Firm*—McGinn IP Law Group, PLLC

(57) ABSTRACT

A solid state imaging device comprises: photoelectrical converting elements arranged on a semiconductor substrate in a row direction and a column direction substantially perpendicular to each other, wherein charges are accumulated in said photoelectrical converting elements; and a plurality of output sections that output signals corresponding to accumulated charges, said photoelectrical converting elements being arranged in an area that is divided into blocks that correspond to said output sections, wherein said blocks include respective correction areas having a corresponding plurality of sets of correction photoelectrical converting elements used in calculating correction data for correcting output dispersions of said output sections, said correction areas include respective continuous areas that are continuous to each other in a boundary between the plurality of blocks, and an obscuring member, positioned above said continuous areas, that obscures an object image formed in each of said continuous areas.

17 Claims, 4 Drawing Sheets

DIGITAL CAMERA AND SOLID STATE IMAGING DEVICE

BACKGROUND OF THE INVENTION

1. Field of the Invention

The present invention relates to a digital camera having a solid state imaging element.

2. Description of the Related Art

In the related art, a technique is known in which, in a solid state imaging element such as a CCD where plural photoelectrical converting elements are arranged on a semiconductor substrate, an area where the photoelectrical converting elements are arranged is divided into plural blocks, and, with using a special signal input to the blocks, output dispersions of plural FDAs (Floating Diffusion Amplifiers) which are disposed for the respective blocks to output a signal corresponding to charges accumulated in the photoelectrical converting elements are corrected (see JP-A-2002-330356).

In the technique disclosed in JP-A-2002-330356, however, a signal source for generating the special signal, and a signal generation section which generates the signal must be disposed in the solid state imaging element. Therefore, this technique is impractical. Furthermore, the special signal must be generated every time an imaging process is conducted, and hence the imaging control is complicated.

SUMMARY OF THE INVENTION

The invention has been conducted in view of the above-discussed circumstances. It is an object of the invention to provide a digital camera in which dispersions of signals obtained from a solid state imaging element can be corrected by a simple configuration, and also a solid state imaging device which is useful in such a digital camera.

According to the present invention, there is provided a digital camera comprising: a solid state imaging element including (i) a plurality of photoelectrical converting elements arranged on a semiconductor substrate in a row direction and a column direction substantially perpendicular to each other, wherein charges are accumulated in said plurality of photoelectrical converting elements and (ii) a plurality of output sections that output signals corresponding to accumulated charges, said plurality of photoelectrical converting elements being arranged in an area that is divided into a plurality of blocks that correspond to said plurality of output sections; a correction data calculating section that calculates a correction data for correcting output dispersions of said plurality of output sections; and a correcting section that uses the correction data to correct said output signals, wherein said plurality of blocks include a plurality of respective correction areas having a corresponding plurality of sets of correction photoelectrical converting elements used in data calculation by said correction data calculating section, said plurality of correction areas include a plurality of respective continuous areas that are continuous to each other in a boundary between the plurality of blocks, an obscuring member, positioned above said continuous areas, that obscures an object image formed in each of said continuous areas; and the correction data calculating section calculates the correction data based on first signals from said plurality of sets of correction photoelectrical converting elements, each set of which being placed in each of said plurality of continuous areas, the first signals being output from said plurality of output sections.

According to the configuration, the correction data for correcting output dispersions of the output sections is calculated on the basis of the signals of the correction photoelectrical converting elements placed in the continuous areas, and the signals of the photoelectrical converting elements are corrected with using the calculated correction data. Therefore, dispersions of the signals obtained from the solid state imaging element can be easily corrected.

According to the present invention, there is provided the digital camera, wherein said plurality of continuous areas include a plurality of respective sets, each comprising in the column direction a plurality of photoelectrical converting element rows arranged in the row direction, the correction data calculating section calculates a plurality of unit correction data sets for correcting output dispersions of said plurality of output sections, corresponding to said plurality of photoelectrical converting element rows, based on said first signals from said plurality of photoelectrical converting element rows, and calculates the correction data using said plurality of unit correction data sets.

According to the configuration, plural unit correction data are calculated respectively for each of the rows included in the continuous areas, and the correction data is calculated with using the plural calculated unit correction data. Therefore, the accuracy of the correction by the correcting section can be improved.

According to the present invention, there is provided the digital camera, further comprising: a storage section that stores the first signals from the continuous areas; and a high-frequency cutoff section that, when said plurality of unit correction data sets include a first unit correction data in which a difference with respect to an average value of said plurality of unit correction data sets is larger than a value, cuts off high-frequency components of signals from a first photoelectrical converting element row used in calculation of the first unit correction data, and outputs second signals, the first unit correction data being stored in the storage section, wherein, based on the second signals, the correction data calculating section recalculates the first unit correction data corresponding to the first photoelectrical converting element row, and, using the first unit correction data and unit correction data sets corresponding to photoelectrical converting element rows other than the first photoelectrical converting element row, calculates the correction data.

According to the configuration, when an abnormality occurs in one of the unit correction data, for example, high-frequency components of the signals of the photoelectrical converting element row which are used in the calculation of the abnormal unit correction data are cut off, and thereafter the unit correction data is again calculated for the photoelectrical converting element row. The correction data is calculated with using the calculated unit correction data. Even when an abnormality occurs in one of the unit correction data, therefore, it is possible to conduct a process in consideration of the abnormality.

According to the present invention, there is provided the digital camera, wherein the obscuring member includes a ground glass portion.

According to the present invention, there is provided the digital camera, wherein correction photoelectrical converting elements in each of said plurality of continuous areas output charges of a substantially same spectral sensitivity.

According to the present invention, there is provided the digital camera, further comprising an ND filter disposed one of (i) between each of said plurality of continuous areas and the obscuring member, and (ii) above the obscuring member.

According to the present invention, there is provided the digital camera, wherein the solid state imaging element further includes: a first charge transfer section that transfers, in the column direction, charges accumulated in the photoelectrical converting elements; and a plurality of second charge transfer sections that transfer, in the row direction, charges from the first charge transfer section, wherein each of said plurality of output sections corresponds to each of said plurality of second charge transfer sections, and output signals correspond to charges transferred from each of said plurality of second charge transfer sections.

According to the present invention, there is provided the digital camera, wherein each of said plurality of correction areas is formed where the photoelectrical converting elements are arranged and are interposed between an image generating area that generates image data, and the corresponding one of said plurality of second charge transfer sections.

According to the present invention, there is provided a solid state imaging device comprising: a plurality of photoelectrical converting elements arranged on a semiconductor substrate in a row direction and a column direction substantially perpendicular to each other, wherein charges are accumulated in said plurality of photoelectrical converting elements; and a plurality of output sections that output signals corresponding to accumulated charges, said plurality of photoelectrical converting elements being arranged in an area that is divided into a plurality of blocks that correspond to said plurality of output sections, wherein said plurality of blocks include a plurality of respective correction areas having a corresponding plurality of sets of correction photoelectrical converting elements used in calculating correction data for correcting output dispersions of said plurality of output sections, said plurality of correction areas include a plurality of respective continuous areas that are continuous to each other in a boundary between the plurality of blocks, and an obscuring member, positioned above said continuous areas, that obscures an object image formed in each of said continuous areas.

According to the present invention, there is provided the solid state imaging device, wherein the obscuring member includes a ground glass portion.

According to the present invention, there is provided the solid state imaging device, wherein correction photoelectrical converting elements in each of said plurality of continuous areas output charges of a substantially same spectral sensitivity.

According to the present invention, there is provided the solid state imaging device, further comprising an ND filter disposed one of (i) between each of said plurality of continuous areas and the obscuring member, and (ii) above the obscuring member.

According to the present invention, there is provided the solid state imaging device, further comprising: a first charge transfer section that transfers, in the column direction, charges accumulated in the photoelectrical converting elements; and a plurality of second charge transfer sections that transfer, in the row direction, charges from the first charge transfer section, wherein each of said plurality of output sections corresponds to each of said plurality of second charge transfer sections, and output signals correspond to charges transferred from each of said plurality of second charge transfer sections.

According to the present invention, there is provided the solid state imaging device, wherein each of said plurality of correction areas is formed where the photoelectrical converting elements are arranged and are interposed between an image generating area that generates image data, and the corresponding one of said plurality of second charge transfer sections.

DETAILED DESCRIPTION OF THE INVENTION

Figure 1:
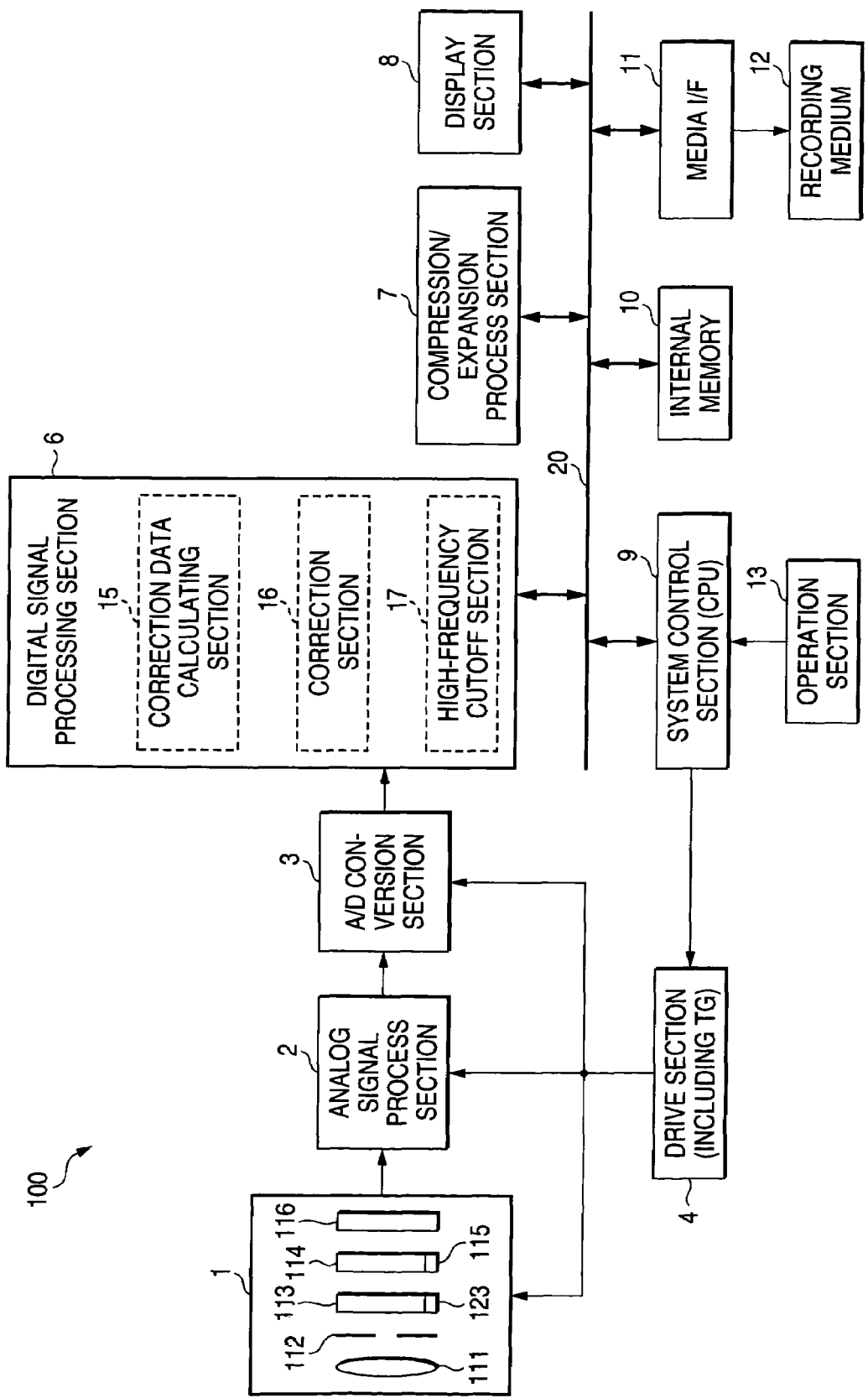
FIG. 1 is a diagram schematically showing the configuration of a digital camera illustrating an embodiment of the invention.

FIG. 1 is a diagram schematically showing the configuration of a digital camera illustrating an embodiment of the invention.

The digital camera 100 of FIG. 1 comprises an imaging section 1, an analog signal process section 2, an A/D conversion section 3, a drive section 4, a digital signal process section 6, a compression/expansion process section 7, a display section 8, a system control section 9, an internal memory 10, a media interface 11, a recording medium 12, and an operation section 13. The digital signal process section 6, the compression/expansion process section 7, the display section 8, the system control section 9, the internal memory 10, and the media interface 11 are connected to a system bus 20.

The imaging section 1 takes an image of an object, and comprises an imaging lens 111, an aperture 112, an infrared cutoff filter 113, an optical low-pass filter 114, a ground glass portion 115, a solid state imaging element 116, and an ND filter 123.

The digital signal process section 6 comprises a correction data calculating section 15, a correcting section 16 and a high-frequency cutoff section 17.

Figure 2:
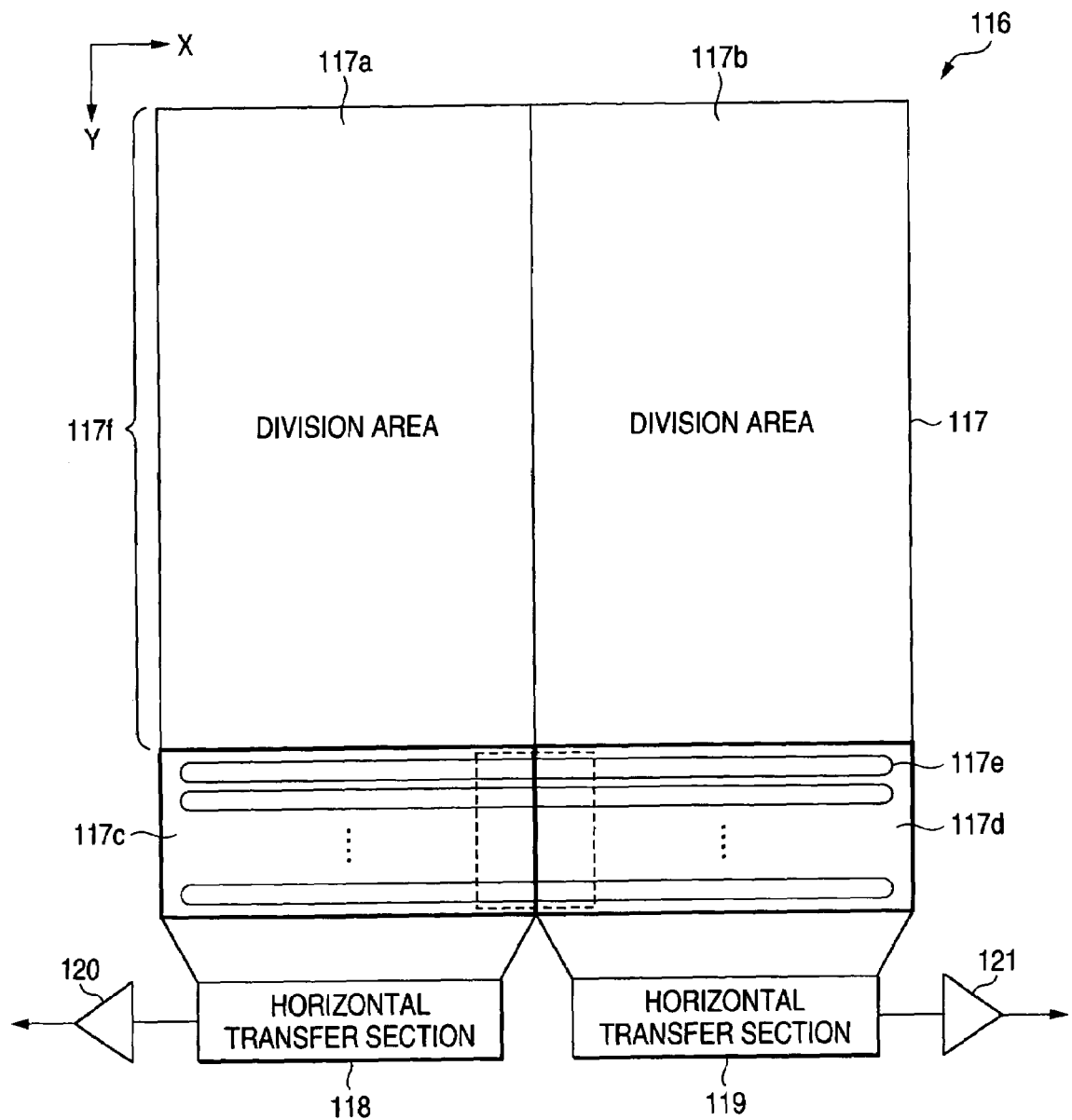
FIG. 2 is a diagram schematically showing the configuration of a solid state imaging element of the digital camera illustrating the embodiment of the invention.

FIG. 2 is a diagram schematically showing the configuration of the solid state imaging element 116.

The solid state imaging element 116 is, for example, a CCD, and comprises: an area 117 where plural photoelectrical converting elements and a vertical transfer section are placed, the photoelectrical converting elements being arranged on the surface of a semiconductor substrate in a row direction (the direction indicated by the arrow X) and a column direction (the direction indicated by the arrow Y) that is perpendicular to the row direction, the vertical transfer section transferring charges of the photoelectrical converting elements in the column direction; horizontal transfer sections 118 and 119 which transfer charges from the vertical transfer section included in the area 117, in the row direction; and plural output sections 120 and 121 which output signals respectively corresponding to charges transferred from the horizontal transfer sections 118 and 119. Signals (hereinafter, often referred to as imaging signals) which are output from the output sections 120 and 121 are supplied to the analog signal process section 2. The output sections 120 and 121 are configured by, for example, FDAs. In the solid state imaging element 116 of the embodiment, the photoelectrical converting elements are arranged in a square lattice.

In an imaging process, the optical system is controlled via the drive section 4. In response to the turning-on of a release switch (not shown) caused by operating a release button (not shown) which constitutes a part of the operation section 13, the solid state imaging element 116 is driven at a timing by a driving signal from a timing generator (indicated by TG in FIG. 1) included in the drive section 4.

The area 117 is divided in the row direction into plural areas, or a division area 117a corresponding to the horizontal transfer section 118 and the output section 120, and a division area 117b corresponding to the horizontal transfer section 119 and the output section 121. According to the configuration, charges accumulated in photoelectrical converting elements included in the division area 117a are transferred to the horizontal transfer section 118 by the vertical transfer section included in the division area 117a, and then transferred from the section to the output section 120. On the other hand, charges accumulated in photoelectrical converting elements included in the division area 117b are transferred to the horizontal transfer section 119 by the vertical transfer section included in the division area 117b, and then transferred from the section to the output section 121.

The division areas 117a and 117b have correction areas 117c and 117d which calculate correction data in order to correct output dispersions of the output sections 120 and 121, respectively. The correction areas 117c and 117d are continuous to each other in the boundary between the division areas 117a and 117b. The correction areas 117c and 117d include plural (for example, ten) photoelectrical converting element rows 117e which extend in the row direction, and which are arranged in the column direction. An image generating area 117f which is obtained by excluding the correction areas 117c and 117d from the area 117 is an area for generating an image.

Figure 3:
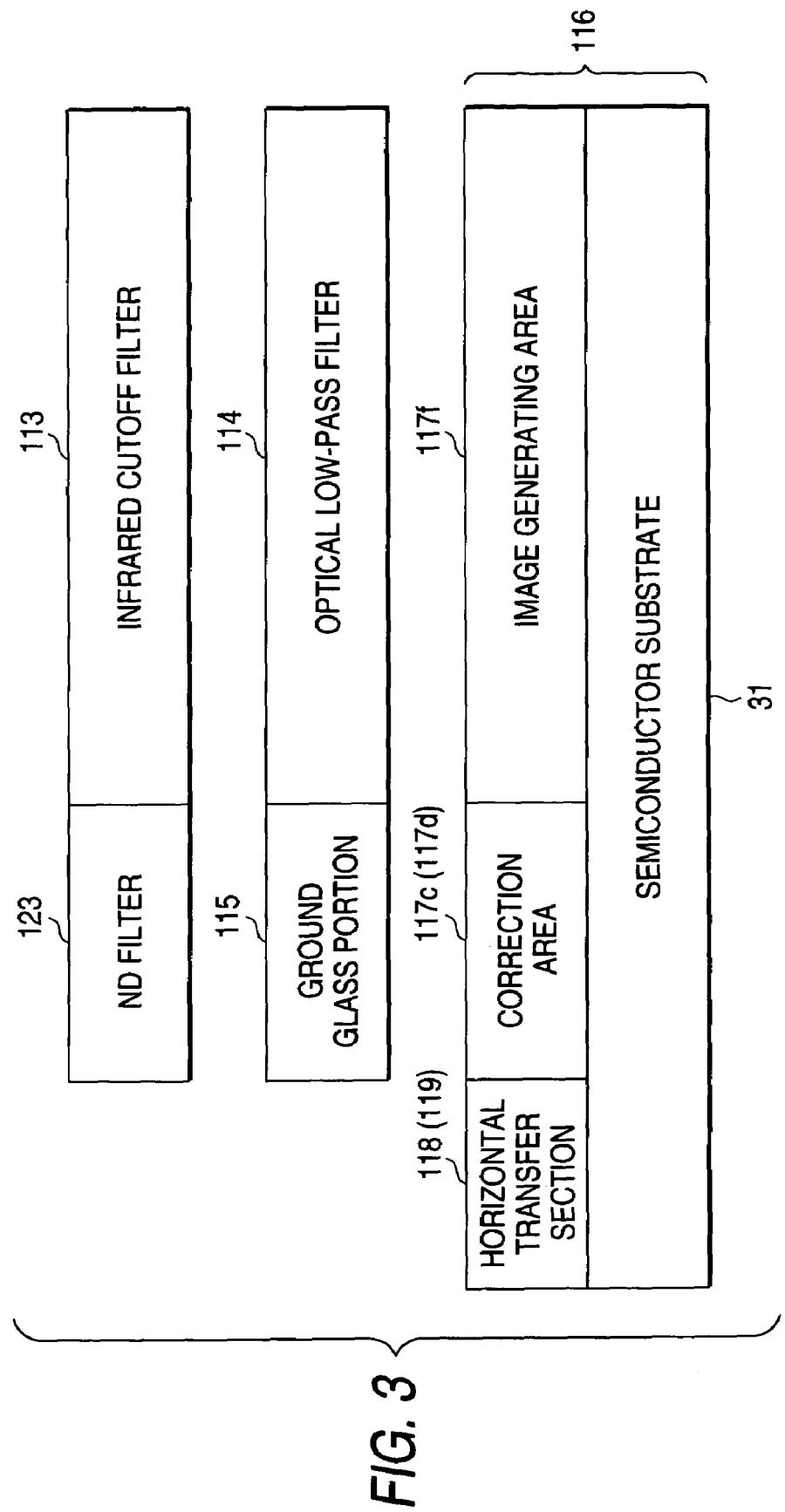
FIG. 3 is a section view of the solid state imaging element of the digital camera and peripheral members illustrating the embodiment of the invention.

FIG. 3 is a section view of the solid state imaging element 116 and peripheral members.

In the solid state imaging element 116, as shown in FIG. 3, the image generating area 117f, the correction areas 117c and 117d, and the horizontal transfer sections 118 and 119 are formed on the semiconductor substrate 31. The optical low-pass filter 114 and the infrared cutoff filter 113 which are shown in FIG. 1 are disposed above the image generating area 117f (on the side of the object). The ground glass portion 115 and the ND filter 123 which are shown in FIG. 1 are disposed above the correction areas 117c and 117d. The ground glass portion 115 and the ND filter 123 may be arranged in reverse order. The ND filter 123 and the infrared cutoff filter 113, the optical low-pass filter 114 and the ground glass portion 115, and the solid state imaging element 116 may be configured as integral components, or alternatively by combining separate components with each other.

The ground glass portion 115 is a member for obscuring an object image formed in the correction areas 117c and 117d. Since the object image formed in the correction areas 117c and 117d is obscured by the ground glass portion 115, the signals obtained from the correction areas 117c and 117d are optimum for calculating the correction data.

The analog signal process section 2 applies a analog signal process on the imaging signal which is obtained in the imaging section 1. The A/D conversion section 3 converts the analog signal which has been processed in the analog signal process section 2, to a digital signal. An output of the A/D conversion section 3 is sent to the digital signal process section 6.

The drive section 4 is controlled by the system control section 9 to output a driving signal, thereby driving the imaging section 1, the analog signal process section 2, and the A/D conversion section 3.

The digital signal process section 6 applies a digital process on the digital signal output from the A/D conversion section 3 to generate an image data. The digital signal process section 6 calculates the correction data on the basis of the signals of the correction areas 117c and 117d which are output from the output sections 120 and 121. The digital signal process section 6 corrects signals of the image generating area 117f which are output from the output sections 120 and 121, with using the calculated correction data. The digital signal process section 6 is configured by, for example, a DSP.

The compression/expansion process section 7 applies a compressing process on the image data (Y/C data) obtained in the digital signal process section 6, and an expanding process on a compressed image data which is obtained from the recording medium 12.

The internal memory 10 is, for example, a DRAM, and used as a work memory for the digital signal process section 6 and the system control section 9. The internal memory is used also as a buffer memory for temporarily storing a captured image data which is to be stored onto the recording medium 12, and as that for an image data to be displayed on the display section 8. The media interface 11 is used for inputting and outputting data into and from the recording medium 12 such as a memory card.

The system control section 9 is configured mainly by a processor which operates in accordance with programs, and controls the operation of the whole digital camera including an imaging operation.

Hereinafter, the operation of the digital camera 100 will be described.

Figure 4:
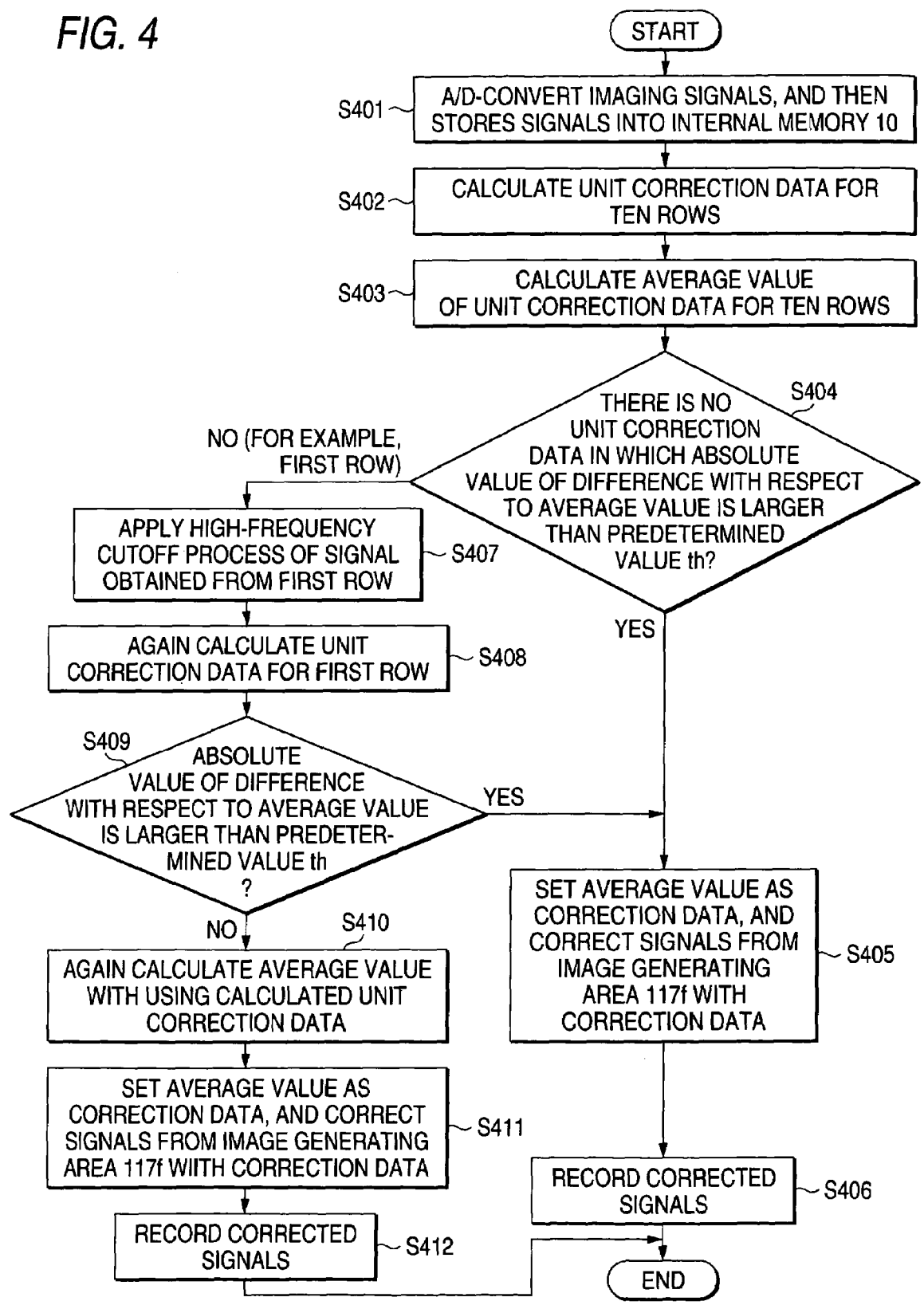
FIG. 4 is a chart showing the operation flow of the digital camera illustrating the embodiment of the invention.

FIG. 4 is a chart showing the operation flow of the digital camera illustrating the embodiment of the invention.

When an imaging instruction is given through the operation section 13, the digital camera 100 conducts an imaging process by means of the imaging section 1, imaging signals obtained from the solid state imaging element 116 are A/D-converted, and the converted digital signals are once stored into the internal memory 10 (S401) serving as a storage section.

Among the signals stored in the internal memory 10, in a normal situation, the waveform (denoted by a) of a signal of an i-th (i=1 to 10) row of the correction area 117c which is output from the output section 120 is continuous to the waveform (denoted by b) of a signal of the i-th row of the correction area 117d which is output from the output section 121, in the boundary between the correction areas 117c and 117d. However, a step is formed in the boundary between the two waveforms because of output dispersions of the output sections 120 and 121.

Therefore, the digital signal process section 6 compares digital signals stored in the internal memory 10, or the signal of the i-th (i=1 to 10) row of the correction area 117c which is output from the output section 120, with that of the i-th row of the correction area 117d which is output from the output section 121, to detect the step between the signals. The correction data calculating section 15 in the digital signal process section 6 calculates a correction data which can eliminate the detected step, for each of the ten photoelectrical converting element rows 117e of the correction areas 117c and 117d (S402). Hereinafter, such a correction data which is obtained for each row is referred to as a unit correction data. Thereafter, the digital signal process section 6 calculates the average value of the ten calculated unit correction data (S403).

As described above, the internal memory 10 performs the function of storing signals from correction photoelectrical converting element rows, the signals being output from the output sections. However, the storage section that performs this function is not limited to the internal memory 10, and any well-known equivalent information storage structure may be employed. For example, but not by way of limitation, an optical or magnetic disk, a portable memory storage device, a remote data storage system, or other data storage structure as would be known to one of ordinary skill in the art may be employed.

After the average value is calculated, the digital signal process section 6 determines whether, in the ten unit correction data, there is no unit correction data in which the absolute value of the difference with respect to the average is larger than a value th or not.

If it is determined that there is no unit correction data in which the absolute value of the difference with respect to the average value is larger than the value th (S404: YES), the digital signal process section 6 sets the average value calculated in S403 as a correction data for correcting the output dispersions of the output sections 120 and 121. The gains of the digital signals which are obtained from the image generating area 117f and stored in the internal memory 10 are corrected with using the correction data (S405) in the correction section 16. The digital signal process is applied on the gain-corrected digital signals. In the digital camera 100, the image data after the digital signal process are compressed and then stored onto the recording medium 12 (S406).

By contrast, if it is determined that there is a unit correction data in which the absolute value of the difference with respect to the average value is larger than the value th (S404: NO), the high-frequency cutoff section 17 in the digital signal process section 6 applies a filtering process of cutting off a high-frequency component of a digital signal, on one(s) of the digital signals of the ten photoelectrical converting element rows 117e which are stored in the internal memory 10, or a digital signal output from the row (for example, the first row) which is used in the calculation of the unit correction data in which the difference is larger than the value th (S407). The digital signal process section again calculates the unit correction data for the first row with using the filtered digital signal (S408).

Thereafter, the digital signal process section 6 determines whether or not the absolute value of the difference between the unit correction data for the first row calculated in S408 and the average value calculated in S403 is larger than the value th.

If it is determined that the absolute value of the difference with respect to the average value is smaller than the value th (S409: NO), the digital signal process section 6 calculates the average value of the unit correction data for the first row calculated in S408 and the nine unit correction data for the second to tenth rows calculated in S402, or the ten unit correction data in total (S410). The digital signal process section 6 then sets the calculated average value as a correction data for correcting the output dispersions of the output sections 120 and 121, and corrects the gains of the digital signals which are obtained from the image generating area 117f and stored in the internal memory 10, with using the correction data (S411) in the correction section 16. The digital signal process is applied on the gain-corrected digital signals. In the digital camera 100, the image data after the digital signal process are compressed and then stored onto the recording medium 12 (S412).

By contrast, if it is determined in S409 that the absolute value of the difference with respect to the average value is larger than the value th (S409: YES), the digital signal process section 6 transfers the control to the process of S405.

As described above, in the digital camera 100, the output dispersions of the output sections 120 and 121 can be corrected with using the signals of the correction areas 117c and 117d. Unlike the conventional art, therefore, it is possible to obtain excellent image data without requiring complicated configurations and controls.

Incidentally, each of the analog signal process section 2, the digital signal process section 6 (including the correction data calculating section 15, the correcting section 16 and the high-frequency cutoff section 17), the compression/expansion process section 7 and the system control section 9 is primarily constituted of a processor which operates in accordance with a program. For example, but not by way of limitation, each of the above-mentioned sections that performs the foregoing function can be a general purpose computer containing a set of instructions for the function.

In the digital camera 100, ten unit correction data are calculated from the ten photoelectrical converting element rows 117e included in the correction areas 117c and 117d, and the ten calculated unit correction data are averaged to calculate the correction data. Therefore, the output dispersions of the output sections 120 and 121 can be accurately corrected.

In the digital camera 100, in the case where the ten calculated unit correction data include a unit correction data of a value which is extremely different from the values of the other unit correction data, a high-frequency cutoff filtering process is applied on the digital signal which is obtained from the row used in the calculation of the unit correction data, and thereafter the unit correction data for the row is again calculated. The correction data is then calculated with using the calculated unit correction data.

Even when an abnormality occurs in the digital signals obtained from the correction areas 117c and 117d, therefore, the correction data can be calculated in consideration of the abnormality. A case may occur where, although a unit correction data is again calculated as described above, an abnormality remains to be detected. In such a case, it is determined that the abnormality is caused in the process of the digital signal process section 6, and the control is transferred to the process of S405. Therefore, it is possible to prevent erroneous correction from being conducted.

In the above, in order to calculate the correction data, the signals of the i-th (i=1 to 10) rows of the correction area 117c which are output from the output section 120, and those of the i-th rows of the correction area 117d which are output from the output section 121 are used. However, it is not necessary to use all of these signals.

In order to calculate the correction data, it is required at the minimum to obtain signals of degrees at which the step between the waveforms a and b can be detected and the detected step can be determined to be caused by output dispersions of the output sections 120 and 121. The correction data can be calculated with using the signals. Namely, only the following are required. The required minimum signals are obtained from continuous areas (the area enclosed by the broken line in FIG. 2) which are included respectively in the correction areas 117c and 117d, and in which the correction areas 117c and 117d are continuous to each other in the boundary. Photoelectrical converting elements the number of which is sufficient for enabling the determination (enabling the waveform of a signal from an i-th photoelectrical converting element row to be approximately grasped) are included in the continuous areas.

In the digital camera 100, in order to take a color photograph, a color filter which is not shown is disposed between the photoelectrical converting elements included in the image generating area 117f and the optical low-pass filter 114. However, such a color filter is preferably not disposed between the correction areas 117c and 117d and the ground glass portion 115, or a monocolor (one of colors related to the color filter) filter is preferably disposed therebetween. This configuration is employed because of the following reasons. In the case where signals which are to be used for calculating the correction data have the same spectral sensitivity, the signals can be handled more easily. In this case, even when an object in which the spatial frequency is high in the row direction of the correction areas 117c and 117d exists, moreover, output dispersions of the output sections 120 and 121 can be accurately corrected.

A device of the MOS type may be used as the solid state imaging element 116. As the arrangement of the photoelectrical converting elements in the area 117, another kind of arrangement such as the so-called honeycomb arrangement may be employed in which elements of odd rows are shifted in the column direction with respect to those of even rows by a distance equal to about one half of the pitch in the column direction of the photoelectrical converting elements.

According to the invention, it is possible to provide a digital camera in which dispersions of signals obtained from a solid state imaging element can be corrected by a simple configuration, and also a solid state imaging device which is useful in such a digital camera.

This application is based on Japanese patent application JP 2003-384645, filed on Nov. 14, 2003, the entire content of which is hereby incorporated by reference, the same as if set forth at length.

What is claimed is:

1. A digital camera comprising:
    a solid state imaging element including:
        a plurality of photoelectrical converting elements arranged on a semiconductor substrate in a row direction and a column direction substantially perpendicular to each other, wherein charges are accumulated in said plurality of photoelectrical converting elements; and
        a plurality of output sections that output signals corresponding to accumulated charges, said plurality of photoelectrical converting elements being arranged in an area that is divided into a plurality of blocks that correspond to said plurality of output sections,
    a correction data calculating section that calculates a correction data for correcting output dispersions of said plurality of output sections; and
    a correcting section that uses the correction data to correct said output signals,
    wherein said plurality of blocks include a plurality of respective correction areas having a corresponding plurality of sets of correction photoelectrical converting elements used in data calculation by said correction data calculating section,
    said plurality of correction areas include a plurality of respective continuous areas that are continuous to each other in a boundary between the plurality of blocks,
    an obscuring member, positioned above said continuous areas, that obscures an object image formed in each of said continuous areas; and
    the correction data calculating section calculates the correction data based on first signals from said plurality of sets of correction photoelectrical converting elements, each set of which being placed in each of said plurality of continuous areas, the first signals being output from said plurality of output sections.

2. A digital camera according to claim 1,
    wherein said plurality of continuous areas include a plurality of respective sets, each comprising in the column direction a plurality of photoelectrical converting element rows arranged in the row direction,
    the correction data calculating section calculates a plurality of unit correction data sets for correcting output dispersions of said plurality of output sections, corresponding to said plurality of photoelectrical converting element rows, based on said first signals from said plurality of photoelectrical converting element rows, and calculates the correction data using said plurality of unit correction data sets.

3. A digital camera according to claim 2, further comprising:
    a storage section that stores the first signals from the continuous areas; and
    a high-frequency cutoff section that, when said plurality of unit correction data sets include a first unit correction data in which a difference with respect to an average value of said plurality of unit correction data sets is larger than a value, cuts off high-frequency components of signals from a first photoelectrical converting element row used in calculation of the first unit correction data, and outputs second signals, the first unit correction data being stored in the storage section,
    wherein, based on the second signals, the correction data calculating section recalculates the first unit correction data corresponding to the first photoelectrical converting element row, and, using the first unit correction data and unit correction data sets corresponding to photoelectrical converting element rows other than the first photoelectrical converting element row, calculates the correction data.

4. A digital camera according to claim 1, wherein the obscuring member includes a ground glass portion.

5. A digital camera according to claim 1, wherein correction photoelectrical converting elements in each of said plurality of continuous areas output charges of a substantially same spectral sensitivity.

6. A digital camera according to claim 1, further comprising an ND filter disposed one of (i) between each of said plurality of continuous areas and the obscuring member, and (ii) above the obscuring member.

7. A digital camera according to claim 1,
    wherein the solid state imaging element further includes:
    a first charge transfer section that transfers, in the column direction, charges accumulated in the photoelectrical converting elements; and
    a plurality of second charge transfer sections that transfer, in the row direction, charges from the first charge transfer section,
    wherein each of said plurality of output sections corresponds to each of said plurality of second charge transfer sections, and output signals correspond to charges transferred from each of said plurality of second charge transfer sections.

8. A digital camera according to claim 7, wherein each of said plurality of correction areas is formed where the photoelectrical converting elements are arranged and are interposed between an image generating area that generates image data, and the corresponding one of said plurality of second charge transfer sections.

9. A solid state imaging device comprising:
    a plurality of photoelectrical converting elements arranged on a semiconductor substrate in a row direction and a column direction substantially perpendicular to each other, wherein charges are accumulated in said plurality of photoelectrical converting elements; and
    a plurality of output sections that output signals corresponding to accumulated charges, said plurality of photoelectrical converting elements being arranged in an area that is divided into a plurality of blocks that correspond to said plurality of output sections,
    wherein said plurality of blocks include a plurality of respective correction areas having a corresponding plurality of sets of correction photoelectrical converting elements used in calculating correction data for correcting output dispersions of said plurality of output sections, said plurality of correction areas include a plurality of respective continuous areas that are continuous to each other in a boundary between the plurality of blocks, and an obscuring member, positioned above said continuous areas, that obscures an object image formed in each of said continuous areas.

10. A solid state imaging device according to claim 9, wherein the obscuring member includes a ground glass portion.

11. A solid state imaging device according to claim 9, wherein correction photoelectrical converting elements in each of said plurality of continuous areas output charges of a substantially same spectral sensitivity.

12. A solid state imaging device according to claim 9, further comprising an ND filter disposed one of (i) between each of said plurality of continuous areas and the obscuring member, and (ii) above the obscuring member.

13. A solid state imaging device according to claim 9, further comprising:

a first charge transfer section that transfers, in the column direction, charges accumulated in the photoelectrical converting elements; and a plurality of second charge transfer sections that transfer, in the row direction, charges from the first charge transfer section, wherein each of said plurality of output sections corresponds to each of said plurality of second charge transfer sections, and output signals correspond to charges transferred from each of said plurality of second charge transfer sections.

14. A solid state imaging device according to claim 9, wherein each of said plurality of correction areas is formed where the photoelectrical converting elements are arranged and are interposed between an image generating area that generates image data, and the corresponding one of said plurality of second charge transfer sections.

15. A digital camera comprising:

a solid state imaging element including:

a plurality of photoelectrical converting elements arranged on a semiconductor substrate in a row direction and a column direction substantially perpendicular to each other, wherein charges are accumulated in said plurality of photoelectrical converting elements; and a plurality of output sections that output signals corresponding to accumulated charges, said plurality of photoelectrical converting elements being arranged in an area that is divided into a plurality of blocks that correspond to said plurality of output sections, means for calculating a correction data that corrects output dispersions of said plurality of output sections; and means for correcting signals output from said plurality of output sections using the correction data, wherein said plurality of blocks include corresponding correction areas having a corresponding plurality of sets of correction photoelectrical converting elements used by said means for calculating to calculate the correction data;

said plurality of correction areas include a plurality of respective continuous areas that are continuous to each other in a boundary between the plurality of blocks, an obscuring member, positioned above said continuous areas, that obscures an object image formed in each of said continuous areas; and said means for calculating calculates the correction data based on first signals from said plurality of sets of correction photoelectrical converting elements, the first signals being output from said plurality of output sections.

16. A digital camera according to claim 15, wherein said plurality of continuous areas include a plurality of respective sets, each comprising in the column direction a plurality of photoelectrical converting element rows arranged in the row direction, said means for calculating calculates a plurality of unit correction data sets for correcting output dispersions of said plurality of output sections, corresponding to said plurality of photoelectrical converting element rows, based on the first signals from said plurality of photoelectrical converting element rows, and calculates the correction data using said plurality of unit correction data sets.

17. A digital camera according to claim 16, further comprising:

means for storing the first signals from the continuous areas; and means for, when said plurality of unit correction data sets include a first unit correction data in which a difference with respect to an average value of said plurality of unit correction data sets is larger than a value, cutting off high-frequency components of signals from a first photoelectrical converting element row used in calculation of the first unit correction data, and generates second signals, the first unit correction data being stored in the storage section, wherein, based on the second signals, the correction data calculating section recalculates the first unit correction data corresponding to the first photoelectrical converting element row, and, using the first unit correction data and unit correction data sets corresponding to photoelectrical converting element rows other than the first photoelectrical converting element row, calculates the correction data.

* * * * *